United States Patent
Jonsson et al.

(10) Patent No.: US 10,812,224 B2
(45) Date of Patent: Oct. 20, 2020

(54) NR USER PLANE SIGNALING CONTROLLED TRIGGERING OF PDCP DUPLICATION

(71) Applicant: Telefonaktiebolaget LM Ericsson (publ), Stockholm (SE)

(72) Inventors: Anders Jonsson, Täby (SE); Angelo Centonza, Stockholm (SE); Matteo Fiorani, Solna (SE); Martin Skarve, Enebyberg (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 16/329,885

(22) PCT Filed: Feb. 21, 2019

(86) PCT No.: PCT/EP2019/054384
§ 371 (c)(1),
(2) Date: Mar. 1, 2019

(87) PCT Pub. No.: WO2019/162418
PCT Pub. Date: Aug. 29, 2019

(65) Prior Publication Data
US 2020/0127766 A1   Apr. 23, 2020

Related U.S. Application Data

(60) Provisional application No. 62/633,996, filed on Feb. 22, 2018.

(51) Int. Cl.
*H04L 1/08*   (2006.01)
*H04B 17/309*   (2015.01)
(Continued)

(52) U.S. Cl.
CPC .............. *H04L 1/08* (2013.01); *H04B 7/06* (2013.01); *H04B 17/309* (2015.01);
(Continued)

(58) Field of Classification Search
CPC ....... H04L 1/08; H04L 1/0009; H04L 1/0026; H04L 1/1812; H04L 1/1825;
(Continued)

(56) References Cited

U.S. PATENT DOCUMENTS

2020/0119864 A1* 4/2020 Xu .................. H04L 1/1858
2020/0128605 A1* 4/2020 Tang ................ H04L 1/189

FOREIGN PATENT DOCUMENTS

EP   1742494 A1   1/2007

OTHER PUBLICATIONS

ZTE, 'Consideration on fast duplication activation and deactivation over F1', 3GPP TSG RAN WG3 NR ADHOC R3-180135 Sophia Antipolis, France, Jan. 22-26, 2018. (Year: 2018).*

(Continued)

*Primary Examiner* — Melvin C Marcelo
(74) *Attorney, Agent, or Firm* — Murphy, Bilak & Homiller, PLLC

(57) ABSTRACT

In one aspect, one or more network nodes configured control the use of data duplication (DD) for a UE simultaneously served by two or more distributed transmission units (DUs) receive from one or more of the DUs, feedback information. The one or more network nodes determine, based on the feedback information, whether to activate DD for transmissions to the UE.

25 Claims, 14 Drawing Sheets

(51) Int. Cl.
*H04B 7/06* (2006.01)
*H04L 1/00* (2006.01)
*H04L 1/18* (2006.01)
*H04L 5/00* (2006.01)
*H04L 12/26* (2006.01)
*H04W 28/06* (2009.01)

(52) U.S. Cl.
CPC .......... *H04L 1/0009* (2013.01); *H04L 1/0026* (2013.01); *H04L 1/1812* (2013.01); *H04L 1/1825* (2013.01); *H04L 5/0057* (2013.01); *H04L 43/0829* (2013.01); *H04W 28/06* (2013.01)

(58) Field of Classification Search
CPC . H04L 5/0057; H04L 43/0829; H04B 17/309; H04B 7/06; H04W 28/06
See application file for complete search history.

(56) References Cited

OTHER PUBLICATIONS

Unknown, Author, "Consideration on the activation or deactivation of duplication", 3GPP TSG-RAN WG3 #98; R3-174408; Reno, NV, Nov. 27-Dec. 1, 2017, pp. 1-3.
Unknown, Author, "DL PDCP Duplication in CU-DU Split Architecture", 3GPP TSG RAN WG3; R3-181363; Athens, Greece, Feb. 26-Mar. 2, 2018, pp. 1-3.
3GPP, "3rd Generation Partnership Project; Technical Specification Group Radio Access Network; NG-RAN; NR user plane protocol (Release 15)", 3GPP TS 38.425 V15.0.0, Dec. 2017, 1-17.
3GPP, "3rd Generation Partnership Project; Technical Specification Group Services and System Aspects; System Architecture for the 5G System; Stage 2 (Release 15)", 3GPP TS 23.501 V15.0.0, Dec. 2017, 1-181.
3GPP, "3rd Generation Partnership Project; Technical Specification Group Radio Access Network; NG-RAN; Architecture description (Release 15)", 3GPP TS 38.401 V0.2.0, Jul. 2017, 1-20.

* cited by examiner

| Bits | | | | | | | | Number of Octets |
|---|---|---|---|---|---|---|---|---|
| 7 | 6 | 5 | 4 | 3 | 2 | 1 | 0 | |
| PDU Type (=2) | | | | Data Duplication Information | | | | 1 |
| Data Duplication Subtype | | | | U | | Spare | | 1 |
| Length indicator (Optional) | | | | | | | | 1 |
| Data Duplication information, e.g. SNR, HARQ retransmissions, RLC retransmissions, congestion information etc. | | | | | | | | 1-n |
| Spare extension | | | | | | | | 1-m |

*FIG. 6*

NR USER PLANE SIGNALING CONTROLLED TRIGGERING OF PDCP DUPLICATION

TECHNICAL FIELD

The present invention relates to communication systems, such as wireless communication networks, and particularly relates to controlling the use of data duplication (DD) for a user equipment (UE) simultaneously served by two or more distributed transmission units (DUs).

BACKGROUND

FIG. 1 illustrates a 5G radio access network (RAN), or NG-RAN, architecture, as described in 3GPP TS 38.401, v. 0.3.0. The NG-RAN consists of a set of gNBs connected to the 5G core (5GC) through the NG logical interface, where a gNB may be regarded as a base station for the NG-RAN. A gNB can support frequency division duplex (FDD) mode, time division duplex (TDD) mode or dual mode operation. gNBs can be interconnected through the Xn logical interface. A gNB may consist of a gNB central unit (gNB-CU) and gNB distributed units (gNB-DUs). A gNB-CU and a gNB-DU are connected via an F1 logical interface. One gNB-DU is connected to only one gNB-CU. For resiliency, a gNB-DU may be connected to multiple gNB-CU by appropriate implementation. Note that a "gNB" can be understood as a logical node, which may be implemented in one or several physical nodes. For example, one or several gNB-DUs that make up part of a given gNB may be implemented in hardware that is physically separated (in some cases by large distances) from each other and/or from the gNB-CU. Note that in the discussion that follows, the gNB-CU and gNB-DU may sometimes be referred to as simply "CU" and "DU," respectively.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all Access and Mobility Functions (AMFs) within an AMF Region. The AMF Region is defined in 3GPP TS 23.501.

For NG-RAN, the NG and Xn-C interfaces for a gNB consisting of a gNB-CU and gNB-DUs terminate in the gNB-CU. For E-UTRAN New Radio-Dual Connectivity (EN-DC), the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The architecture in FIG. 1 can be expanded by splitting the gNB-CU into two entities. This includes, for example, one gNB-CU that serves the user plane and hosts the Packet Data Convergence Protocol (PDCP) protocol, and one gNB-CU-CP that serves the control plane and hosts the PDCP and Radio Resource Control (RRC) protocols. The gNB-CU-CP and the gNB-CU-UP are logical entities and may be implemented in the same or different physical units.

In Dual- or Multi-Connectivity scenarios (henceforth referred to collectively as DC) data to a UE can be sent to at least two Radio Link Control (RLC) entities located in one or more DUs connected to a CU. The data incoming to the CU can thus be sent via either DU, but, in some cases, it is beneficial to send duplicate data, i.e., the same higher layer data via both RLC entities. This is known in existing technology as Data Duplication, henceforth referred to as DD.

DD can also be performed in Carrier Aggregation (CA) scenarios, where one or more RAN nodes deliver traffic to a UE by means of aggregating carrier resources. In this case, multiple logical channels can be setup over the aggregated carrier resources, which may be hosted by a single DU. DD is performed over such multiple logical channels towards the UE.

The CU ensures that the data sent from higher layers is appropriately split between the two DUs based on the data handling capacity of each leg. If data is being sent over both legs in, for example, a DC scenario, and the data transmission is in balance, the UE will receive the data more or less in order from both DUs. However, the data transmissions from the two DUs to the UE can never be completely synchronized and therefore the UE is equipped with a reordering buffer so that data can arrive slightly out of sequence from both legs but still be delivered to higher layers in sequence. This functionality in the UE ensures that, as long as the data transmissions from both legs are reasonably well synchronized and the buffers in both DUs are balanced, there is no need for any DD. However, in practice, this is difficult to achieve and problems that can arise in a DC scenario.

SUMMARY

It is recognized herein that a problem with existing solutions is that while DD in DC is a known method to improve data throughput and connection retainability, the logic to decide when to do the DD needs to be based on suitable and timely input, or else DD could be used too frequently, leading to unneeded DD that takes up valuable bandwidth in the Transport Network and air interface. Or, if used too sparingly, the use of DD could lead to decreased throughput when data is held up due to in-order delivery requirements or to dropped calls if the DU with the critical data is unable to send this to the UE due to poor radio or congestion conditions (and no DD is performed on the other leg to alleviate the situation). Similarly, in the case of CA, it is currently not possible to decide when to start duplication, due to deterioration of radio quality over logical channels, and when to stop it.

Embodiments of the present invention provide for suitable metrics to be sent from the DU to the CU, to trigger DD. Methods for conveying this information over the interface between the CU and the DU are also described. For example, this information may be conveyed via in-band signaling in a NR user plane data frame as outlined below. The functionality described herein is beneficial in 5G dual connectivity scenarios involving higher frequencies with limited coverage, and includes a fast method to activate and deactivate DD.

In an example deployment where the CU is split into a user plane part (CU-UP) and a control plane part (CU-CP) connected over a standard interface (i.e., E1 interface as specified in TS 38.46x), the information is conveyed from the DU to the CU-UP. Based on this information, the CU-UP may make the decision as to when to activate or deactivate DD. The CU-UP may merge information for different DUs and/or different nodes (eNB and/or NG-RAN node) to make decisions. As an example, the CU-UP may receive Data Duplication Information (DDI) concerning radio quality over the multiple logical channels used for duplicating data, where radio quality is sufficiently good for one channel but poor for another. This may prompt to a decision not to trigger duplication, as data can be reliably received by the UE via one channel transmission only. Alternatively, the radio quality may be poor for both channels, in which case the CU-UP may decide to start DD so to increase the chances that the UE receives data correctly.

It should be also noted that the CU-UP may indicate to the CU-CP the results of its decisions on whether to activate or deactivate DD. This may help the CU-CP to coordinate UE configurations, e.g., via RRC signaling. For example, if the CU-UP has activated DD and it communicates this to the CU-CP, the CU-CP may refrain from issuing an RRC configuration towards the UE that sets DD to "not active".

In a similar way, the CU-CP may inform the CU-UP of the RRC configuration for DD that has been issued to the UE. For example, the CU-CP may have configured the UE with DD as "not active". In this case, the CU-CP should communicate this information to the CU-UP, so that the CU-UP does not start DD towards the UE, which may result in a waste of resources due to the UE only monitoring one logical channel and thus not receiving duplicated data.

One advantage of the embodiments is that suitable information to trigger DD can be conveyed from DUs to the CU to provide a good basis for the decision logic in the CU on when to trigger DD. This results in additional advantages. One advantage is that valuable TN and air interface bandwidth will be saved, since DD will only be triggered when needed. Consequently, less redundant data, due to unnecessary DD, will be generated. Another advantage is that retainability and reliability of data delivery will be improved, since DD will be triggered expediently when poor radio conditions that warrant DD have been identified.

FIG. 2 illustrates NR user plane in-band signaling with a CU 202 and two DUs 204, 206. Solutions for utilizing in-band NR user plane signaling, according to embodiments described herein, may ensure that the DD triggering information can be conveyed expediently and with minimal overhead as compared to other more time-consuming procedures, like RRC procedures.

According to some embodiments, a method, in one or more network nodes of a wireless communication system, for controlling the use of DD for a UE simultaneously served by two or more DUs, includes receiving, from one or more of the DUs, feedback information. The method also includes determining, based on the feedback information, whether to activate DD for transmissions to the UE.

According to some embodiments, one or more network nodes of a wireless communication system comprise communication circuitry and processing circuitry operatively associated with the communication circuitry for controlling the use of DD for a UE simultaneously served by two or more DUs. The processing circuitry is configured to receive, from one or more of the DUs, feedback information. The processing circuitry is also configured to determine, based on the feedback information, whether to activate DD for transmissions to the UE.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 6 is a table showing new protocol data unit (PDU) Type 2 data duplication information, according to some embodiments.

DETAILED DESCRIPTION

Figure 1:
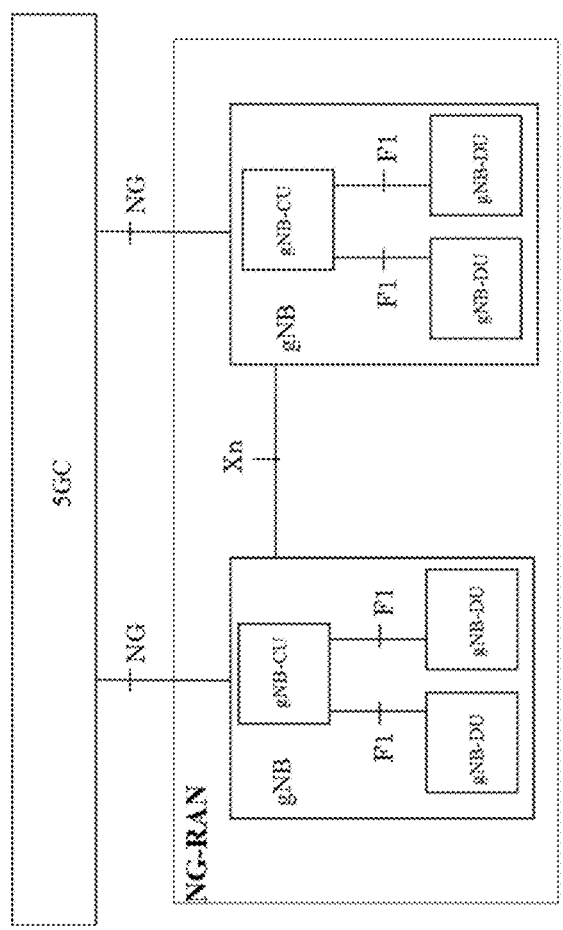
FIG. 1 is a block diagram illustrating the overall NG architecture.
Figure 2:
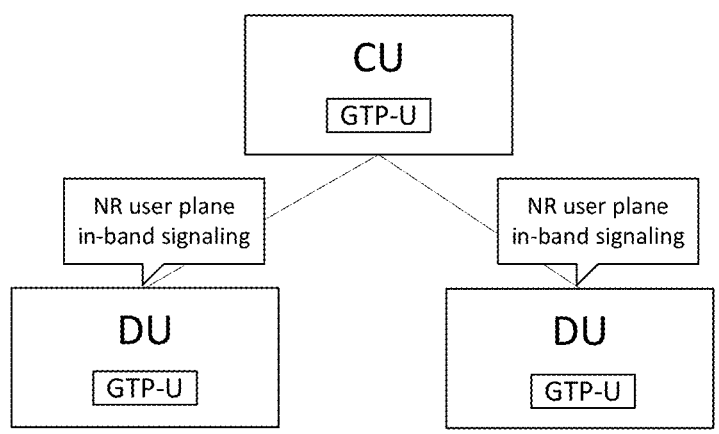
FIG. 2 illustrates NR user plane in-band signaling with two DUs, used for some embodiments.

Embodiments described herein provide for the sending of suitable metrics from the DU to the CU, to trigger data duplication (DD).

In one embodiment, the DD control function resides in the CU and uses feedback information from the DUs to determine when to activate DD. This information to the CU can be conveyed by any of the protocols connecting the CU and DU. The NR user plane protocol, as defined in 3GPP TS 38.425, can also be used.

The CU evaluates the feedback information received from one or more radio link control (RLC) entities for a bearer. The evaluation may, besides the feedback, also include other input parameters such as configured thresholds, quality of service (QoS) attributes and performance and load related information available in the CU. The evaluation outcome decides if DD shall be triggered or not. Details related to the signaling and examples of different information elements are described below.

NR User Plane Frames for Data Duplication Signaling

In order to convey the information elements listed below, a new PDU type may be added to 3GPP TS 38.425. In the current standard, PDU Types 0 and 1 are already used and the new PDU Type Data Duplication Information can for example use the next available PDU Type which is 2. As an example, by utilizing the 4 bits after the PDU Type field, 16 different types of DD triggering information elements Data Duplication Information (DDI) can be defined. Alternatively, the field that specifies the DD triggering information may be of different sizes, if needed. The size of the different DDI can either be predetermined and fixed, or in another embodiment, one of the octets in the frame contains a Length Indicator as in the table shown in FIG. 6. It may also be beneficial to add an octet following the DDI information that determines a subtype of the information contained in the DDI. An example of this would be subtypes Signal to Noise Ratio (SNR), Channel Quality Indication (CQI), and carrier to interferer (C/I) to the DDI Radio Quality. The above are only examples of different ways to convey the DD information from DU to the CU, and a person skilled in the art recognizes that the fields may be structured in other ways to convey the DD triggering information as listed below.

The table in FIG. 6 is only an example embodiment and that other combinations of data fields can also be used to convey the DD triggering information. One alternative is to use the DL DATA DELIVERY STATUS (PDU Type 1) as may be defined in 3GPP TS 38.425. Using the Cause report flag and Cause value for signaling DD related information and alternatively by defining a new DD flag for the DL DATA DELIVERY STATUS (PDU Type 1) and in this way convey the information elements. Yet, other alternatives are to utilize reserved or spare bits or other "PDU Type" values and subfields. In addition, a person skilled in the art also recognizes that there are other alternative embodiments as well such as utilizing currently unused values of the GTP-U "Next Extension Header" field.

Figure 3:
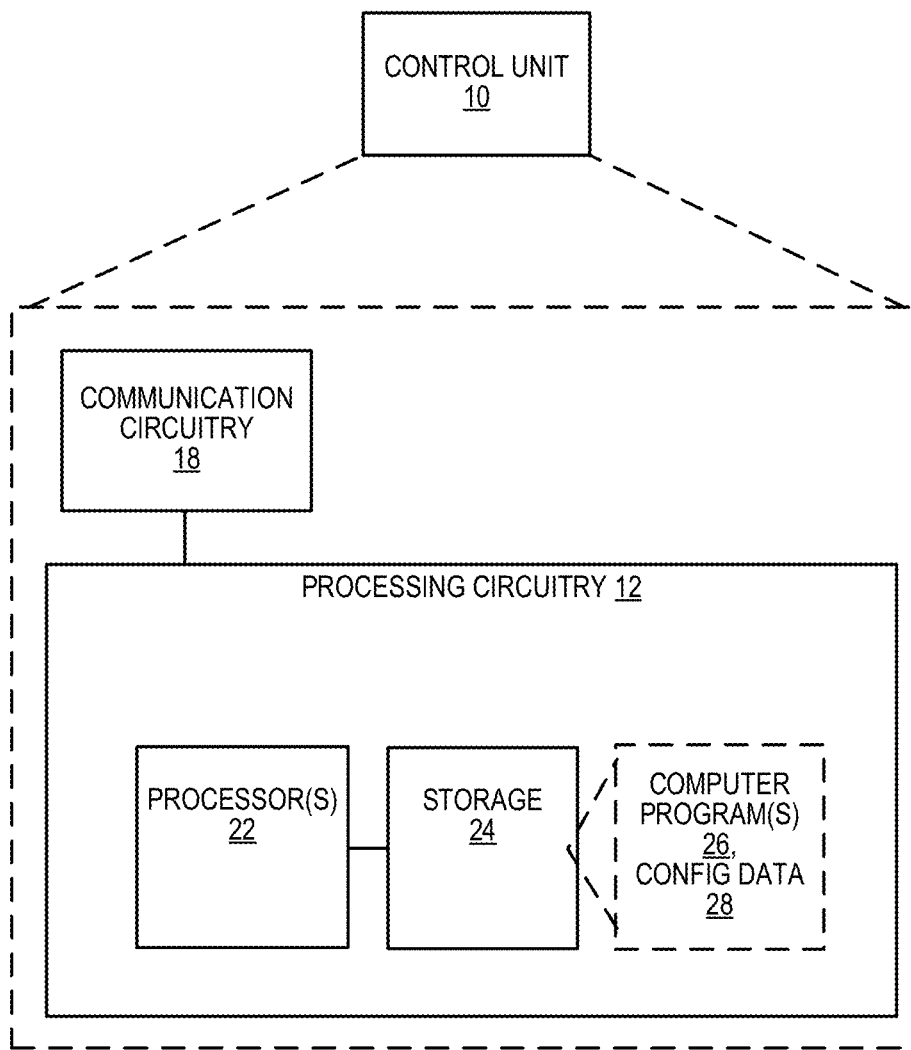
FIG. 3 is a block diagram of a control unit, according to some embodiments.

FIG. 3 illustrates an embodiment of a network node that may operate in accordance with these techniques, as a control unit 10. Control unit 10, such as a gNB-CU, may be connected to and control radio access points (e.g., gNB-DUs). Control unit 10 includes communication circuitry 18 for communicating with DUs or radio access points and with other equipment in the core network (e.g., 5GC).

Control unit 10 further includes processing circuitry 12 that is operatively associated with communication circuitry 18. In an example embodiment, processing circuitry 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 12 may comprise fixed circuitry, or programmable circuitry that is specially configured via the execution of program instructions implementing the functionality taught herein.

Processing circuitry 12 also includes or is associated with storage 24. Storage 24, in some embodiments, stores one or more computer programs 26 and, optionally, configuration data 28. Storage 24 provides non-transitory storage for computer program 26 and it may comprise one or more types of computer-readable media, such as disk storage, solid-state memory storage, or any mix thereof. By way of non-limiting example, storage 24 comprises any one or more of SRAM, DRAM, EEPROM, and FLASH memory.

In general, storage 24 comprises one or more types of computer-readable storage media providing non-transitory storage of computer program 26 and any configuration data 28 used by control unit 10. Here, "non-transitory" means permanent, semi-permanent, or at least temporarily persistent storage and encompasses both long-term storage in non-volatile memory and storage in working memory, e.g., for program execution.

Figure 4:
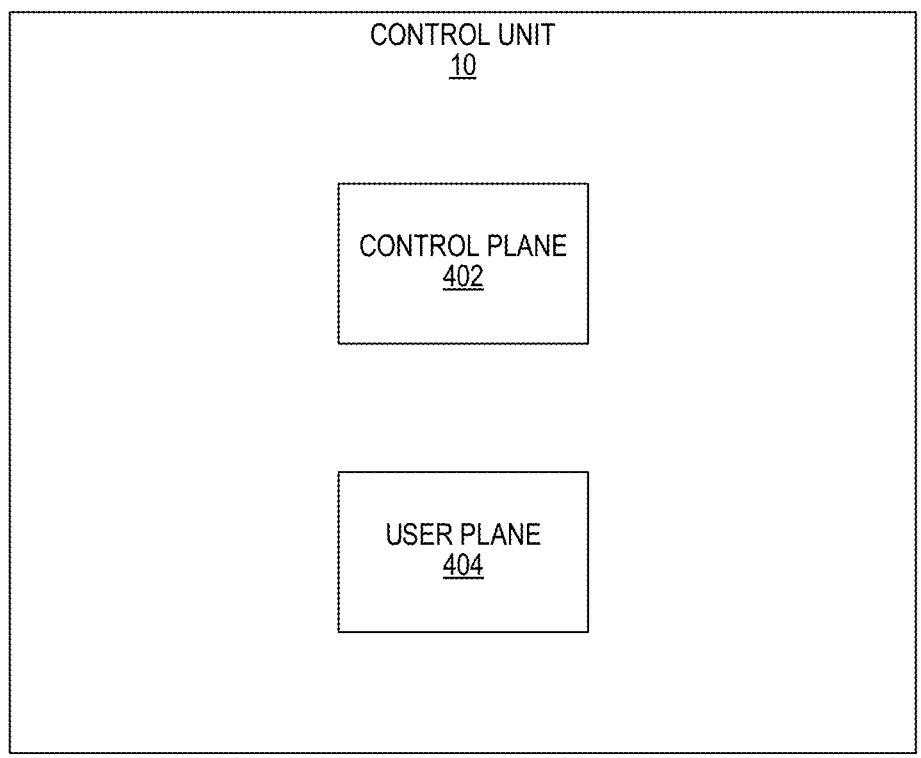
FIG. 4 illustrates an example of a gNB-CU split into two entities, according to some embodiments.

As mentioned earlier, a gNB-CU may be split into two entities. This includes one gNB-CU-UP, which serves the user plane and hosts the PDCP protocol, and one gNB-CU-CP, which serves the control plane and hosts the PDCP and RRC protocol. These two entities are shown in FIG. 4, as control plane 402 and user plane 404, located within the same unit together where the signaling may be internal. While FIG. 4 shows both control plane 402 and user plane 404 entities within control unit 10, as if located with the same unit of a network node. In other embodiments, user plane 404 may be located outside the unit where control plane 402 resides, or even in another network node. Without regard to the exact arrangement, processing circuitry 12 may be considered to be the processing circuitry necessary to carry out the techniques described herein, whether processing circuitry 12 is together in one unit or whether processing circuity 12 is distributed in some fashion.

In some embodiments, processor(s) 22 of processing circuitry 12 may execute a computer program 26 stored in storage 24 that configures processor(s) 22 to control the use of DD for a UE simultaneously served by two or more DUs. Processing circuitry 12 is configured to receive, from one or more of the DUs, feedback information, and determine, based on the feedback information, whether to activate DD for transmissions to the UE.

Figure 5:
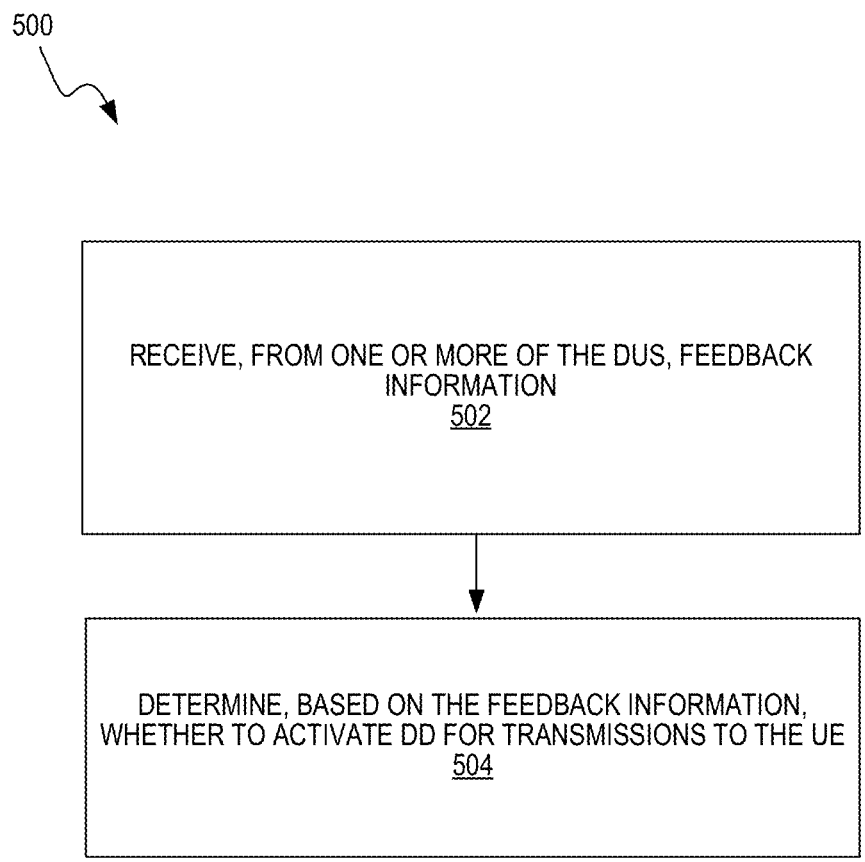
FIG. 5 illustrates a method carried out by the control unit, according to some embodiments.

Processing circuitry 12 of control unit 10, as an example of one or more network nodes, is also configured to perform a corresponding method 500 for controlling the use of DD for a UE. Method 500 is illustrated in FIG. 5 and includes receiving, from one or more of the DUs, feedback information (block 502) and determining, based on the feedback information, whether to activate DD for transmissions to the UE (block 504).

In some embodiments, the feedback information includes, and the determining is based on: an SNR for a link between the UE and the respective DU; a CQI for a link between the UE and the respective DU; a Reference Signal Received Power (RSRP) for a link between the UE and the respective DU; a Reference Signal Received Quality (RSRQ) for a link between the UE and the respective DU; and/or an average Receive Signal Strength Indicator (RSSI) for a link between the UE and the respective DU. The feedback information may be reported on a per-channel basis.

In some cases, the feedback information includes load and/or congestion information for the respective DU, and the determining is based on the load and/or congestion information. The determination may be based on an evaluation of load and/or congestion information for all of the two or more DUs.

The feedback information may include hybrid automatic-repeat-request (HARQ) information and/or retransmission information for the respective DU, and the determining may be based on the HARQ information and/or retransmission information for the respective DU. The feedback information may also include latency and/or packet age information for the respective DU, and the determining may be based on the latency and/or packet age information for the respective DU. The feedback information may include packet loss information for the respective DU, and the determining may be based on the packet loss information for the respective DU. In some embodiments, the feedback information is received via in-band signaling in one or more user-plane data frames.

The method 500 may include activating DD for transmissions to the UE via the two or more DUs. The activating may include sending one or more configuration messages to the UE to indicate that DD is active.

Data Duplication information

There are many different metrics which are all useful to determine if DD should be triggered or not and a number of suitable information elements are listed herein. Note that this list is not exhaustive but contains examples only. It is, within the proposed frame structure (see FIG. 6), possible to define new fields in the DDI frame as needed.

Note that the information elements listed herein each could be used as sole trigger or weighted in combination with one or more of the below mentioned information elements as trigger conditions for when to start and stop DD. Also note that the means to convey the information either as numerical values, ranges or coded are also applicable to the other metrics mentioned below.

In addition, the information elements outlined as part of the DDI may be used to change the logical channel configuration over which duplicated traffic is sent. For example, a UE may be configured with two logical channels over which duplicate traffic is sent. One of these channels is configured as primary, so that in case duplication is deactivated, traffic is transmitted only on the primary channel. By means of the DDI, the CU can reconfigure the primary logical channel, in case the DDI shows that another logical channel configuration better serves the role of primary. This could happen if the DDI shows that the primary logical channel is often subject to poor radio quality, while the secondary logical channel enjoys good radio quality.

Radio Quality Information

Poor radio conditions may be used to determine that it is beneficial to start DD. Conversely, if radio conditions improve above a certain threshold value, this could be a trigger to stop DD. The information could either be in the form of one or more numerical values, conveyed as value ranges, or coded as very poor, poor, fair, good and very good, etc.

Examples of suitable Radio Quality Information Subtype information elements are SNR, CQI, RSRP, RSRQ, non-standardized (vendor specific) Signal to Interference plus Noise Ratio (SINR), average RSSI and average UE and/or network performed measurements, etc. It shall be noticed that above information elements may be reported per channel to capture the difference in radio environment between different channels.

Congestion/Load Information

A high congestion situation may be used to determine that it is beneficial to start DD. Conversely, if congestion levels fall below a certain threshold value, this could be a trigger to stop DD. Congestion information could, for example, be in the form of a percentage of the total cell or node resource capacity, number of users or bearers, throughput per user or bearer or other measures of capacity.

Different congestion/load situations between the legs may trigger activation/deactivation of DD depending on where they occur. For example, if there is high congestion/load on the TN link, this may trigger deactivation of DD to decrease the load on the TN link. If the congestion/load over the radio interface becomes high for one or both RLC instances, this may trigger deactivation of DD, to decrease the load over the air interface. If the congestion/load over the air interface becomes high for one of the two RLC instances, DD may be triggered to decrease the overall latency.

HARQ Information

A high number of retransmissions and/or HARQ failures per unit of time may be used to determine that it is beneficial to start or stop DD. Conversely, if HARQ retransmissions fall below a certain threshold value, this could be a trigger to stop DD.

RLC Information

A high number of retransmissions and/or HARQ failures per unit of time may be used to determine that it is beneficial to start DD. Conversely, if RLC retransmissions fall below a certain threshold value, this could be a trigger to stop DD.

Rate Difference

If there is a significant difference in the throughput between the connected DUs, this may be a reason to start DD. Conversely, if the throughput rate evens out and falls below a certain threshold value, this could be a trigger to stop DD.

Latency and PDU Age

If there is a significant difference in latency or packet age in the buffer contents of the connected DUs, this may be reason to start DD. Conversely, if the latency or packet age evens out and falls below a certain threshold value, this could be a trigger to stop DD.

Packet Loss Rate

Packet losses on one of the transport links may be a reason to start DD to increase the reliability of packet delivery. This is mainly in the scenarios where the different RLC entities do not share the same transport.

Variation of Rate and Throughput

If the variation of rate or throughput is high for at least one RLC instance, this should trigger DD, because there is a high probability that the latency for at least one leg will be low when the other leg is high.

FIG. 6 illustrates an example frame of what may be a new PDU Type 2 Data Duplication Information, and the following may be an example of what may be described in a section of TS 38.425.

5.5.3 Coding of Information Elements in Frames 5.5.3.1 PDU Type

Description: The PDU Type indicates the structure of the NR user plane frame. The field takes the value of the PDU Type it identifies; i.e. "0" for PDU Type 0. The PDU type is in bit 4 to bit 7 in the first octet of the frame.

Value range: {0=DL USER DATA, 1=DL DATA DELIVERY STATUS, 2=DATA DUPLICATION INFORMATION, 3-15=reserved for future PDU type extensions}

Field length: 4 bits

It should be noted that the DDI information may be conveyed in any available PDU Type sent from a node able to retrieve information concerning radio quality to a node that is in charge of activating or deactivating data duplication. As an example, another PDU Type to be used could be a generic uplink (UL) PDU Type. As a non-limiting example, the DDI could be sent from a gNB-DU to a gNB-CU, from a gNB-DU to an LTE eNB, or from an LTE eNB to a gNB-CU.

The following may also be an example of what may be described in a section of TS 38.425.

5.5.3.X Data Duplication Information

Description: This field defines the sub type to the DATA DUPLICATION INFORMATION PDU Type defined in section 5.5.3.1.

Value range: {0=RADIO QUALITY, 1=HARQ INFORMATION, 2=RLC INFORMATION, 3=CONGESTION/LOAD INFORMATION, . . . , X-15=reserved for future Data Duplication Information extensions}

Value range: (0-15).

Field Length: 4 bits.

5.5.3.Y Data Duplication Subtype

Description: This field defines the sub type to the DATA DUPLICATION INFORMATION PDU Type defined in section 5.5.3.1.

Value Range:

{For Data Duplication Information=0; 0=SIGNAL TO NOISE RATIO, 1=AVERAGE SINR . . . X-15=reserved for future Data Duplication Subtype extensions}

{For Data Duplication Information=1; 0=HARQ FAILURE, 1=HARQ RETRANSMISSIONS . . . X-15=reserved for future Data Duplication Subtype extensions}

Value range: (0-15)

Field Length: 4 bits.

5.5.3.2 Spare

Description: The spare field is set to "0" by the sender and should not be interpreted by the receiver. This field is reserved for later versions.

Value range: (0-2n-1).

Field Length: n bits.

5.5.3.Z Length Indicator Presence

Description: This parameter indicates if there is an octet containing a frame length indicator following the frame header.

Value range: {0=No length indicator octet present, 1=Length indicator octet present}.

Field length: 1 bit.

5.5.3.24 Spare Extension

Description: The spare extension field shall not be sent. The receiver should be capable of receiving a spare extension. The spare extension should not be interpreted by the receiver, since in later versions of the present document, additional new fields might be added in place of the spare extension. The spare extension can be an integer number of octets carrying new fields or additional information; the maximum length of the spare extension field (m) depends on the PDU type.

Value range: 0-2m*8-1.

Field Length: 0-m octets. For the PDU Types defined in the present document m=4.

Some additional observations and proposals will now be described. In RAN2, using a medium access control command element (MAC CE) to activate/deactivate UL PDCP duplication can start/stop duplication more quickly and with less signaling overhead over an air interface as compared to RRC reconfiguration. Such a scheme can adapt to the large fluctuation of the wireless channel, especially the high-frequency deployment, i.e., the frequent change between bad status and good status. Specifically, if the DU finds that the channel status is temporarily bad, it can use MAC CE to activate UL PDCP duplication.

However, signaling a command from the DU to CU-CP and then eventually signaling this from CU-CP to CU-UP does not seem to improve overall signaling delays. It can therefore be assessed that signaling an indication of duplication activation/deactivation from DUs to CU-CP does not improve the latency for activation and deactivation. In other words, it is recognized that F1-C signaling from gNB-DU to CU-CP of data duplication activation/deactivation does not improve the latency for dynamic duplication handling. Moreover, it is believed that the gNB-DU shall not signal an assertive indication to activate/deactivate data duplication to the CU. This is because whether duplication is needed depends on a number of factors outside the control of a single gNB-DU. One factor may be the load on gNB-DUs involved in data duplication. If the load increases on a gNB-DU hosting the primary logical channel, this might be a sign that duplication needs to be activated. If the load on one of the gNB-DUs involved in duplication increases (and leads to congestion), this may be a sign of removing duplication over this node. Another factor may be the radio link quality over other gNB-DUs links. Good or bad radio quality over a given radio link may be the trigger for activation/deactivation of duplication. Another factor may be the amount of traffic needed to be scheduled to the UE. For example, if the amount of traffic is limited, a single transmission may be sufficient, even if radio conditions are not perfect.

For the reasons above, it would be much more useful if the gNB-DU, instead of providing a decision to activate or deactivate data duplication (which is a decision anyhow up to the CU to take), would provide information that could help the CU to better decide if and even anticipate whether data duplication should be activated or not.

Such information could be of different forms, for example: a gNB-DU may provide radio quality information to the gNB-CU in the form of CQI measurement; a gNB-DU may provide load information to the gNB-DU; and a gNB-DU may provide a generalized indication of factors affecting the radio link quality, which could, for example, be an enumerated value representing a generic radio link quality measure. This information from the gNB-DU would help the gNB-CU to take a much more educated decision on whether to enable duplication or not. In sum, it is recognized that it is much more beneficial to let the gNB-DU signal to the gNB-CU radio link quality information that would help the gNB-CU to make a better decision on whether to activate or deactivate data duplication.

Another issue is how to signal such assistance information. In order to shorten the signaling delays, this information may be signaled over the UP protocol, according to some embodiments. That is, it may be much more delay efficient to signal radio link quality information over the UP, i.e., from a gNB-DU to the CU-UP. In order to support the gNB-CU in making a more reliable and faster decision on when to activate/deactivate data duplication, the involved gNB-DUs should signal radio link quality information over the UP to the CU-UP.

This may be the only way to make the signaling potentially needed from gNB-DU to gNB-CU for data duplication activation/deactivation beneficial. This is because radio link quality information may be, in general, useful for the gNB-CU to anticipate decisions concerning radio links management (e.g., traffic switch between radio legs). It may also be up to the gNB-CU to collect enough information (such as RRC measurements) to make a reliable data duplication activation/deactivation decision.

Figure 7:
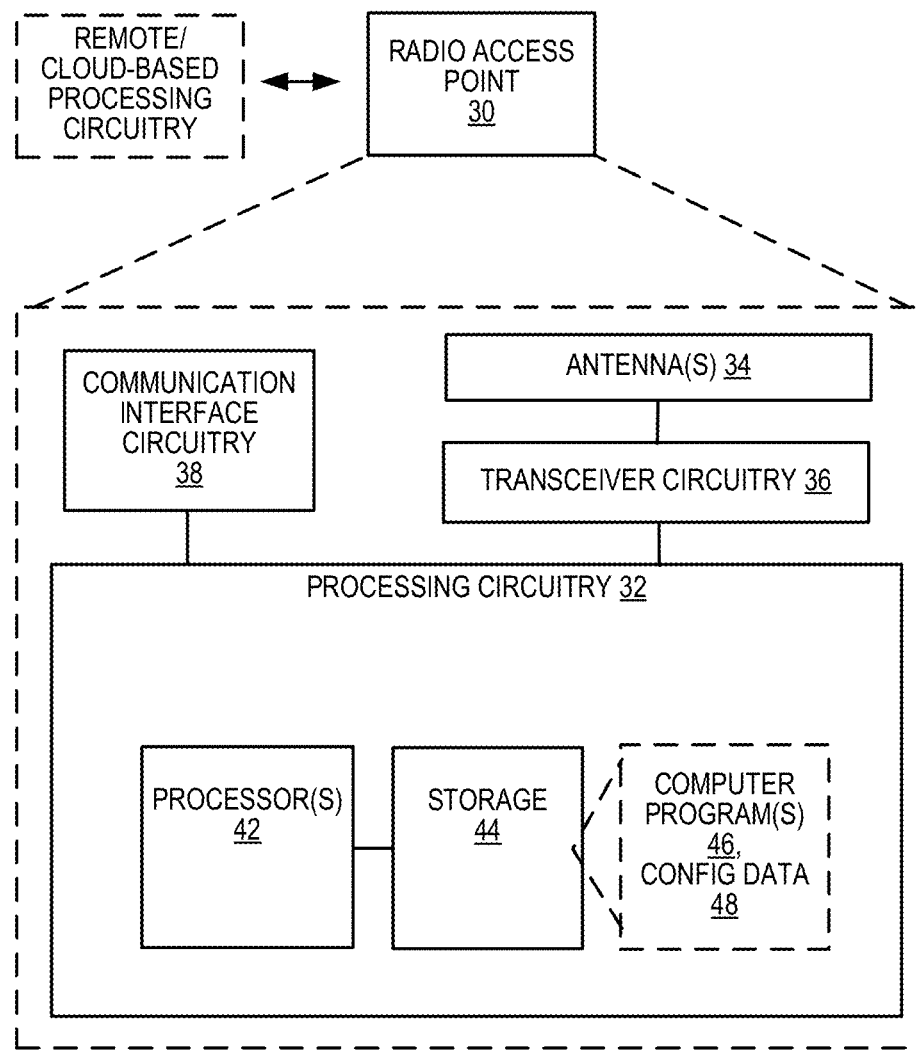
FIG. 7 is a block diagram of a radio access point, according to some embodiments.

FIG. 7 illustrates an example DU, shown as radio access point 30, which may correspond to control unit 10. Radio access point 30 may be a network node that operates as a serving node and is known as or may comprise a part of a gNB, such as a gNB-DU. Radio access point 30 includes communication interface circuitry 38 for communicating with other nodes of the same type or of varying types. For example, radio access point 30 may cooperate with a remote or cloud-based processing element that performs at least some of the processing described herein on the network side.

Radio access point 30 communicates with wireless devices operating in the network via antennas 34 and transceiver circuitry 36. Transceiver circuitry 36 may include transmitter circuits, receiver circuits, and associated control circuits that are collectively configured to transmit and receive signals according to one or more radio access technologies, such as 5G, for communicatively coupling wireless devices to the network.

In one or more embodiments, processing circuitry 32 comprises one or more digital processors 42, e.g., one or more microprocessors, microcontrollers, DSPs, FPGAs, CPLDs, ASICs, or any mix thereof. More generally, processing circuitry 32 may comprise fixed circuitry, or programmable circuitry that is specially configured via the execution of program instructions implementing the functionality taught herein, or may comprise some mix of fixed and programmed circuitry Processing circuitry 32 also includes or is associated with storage 44. Storage 44, in some embodiments, stores one or more computer programs 46 and, optionally, configuration data 48. Storage 44 provides non-transitory storage for computer program 46 and it may comprise one or more types of computer-readable media, such as disk storage, solid-state memory storage, or any mix thereof. By way of non-limiting example, storage 44 comprises any one or more of SRAM, DRAM, EEPROM, and FLASH memory.

In some embodiments, processor 42 of processing circuitry 32 may execute a computer program 46 stored in storage 44 that configures radio access point 30 (e.g., gNB-DU) to operate under the control of a control unit (e.g., gNB-CU), such as control unit 10, that includes the split control plane/user plane architecture that may be used to perform the techniques discussed above.

Figure 8:
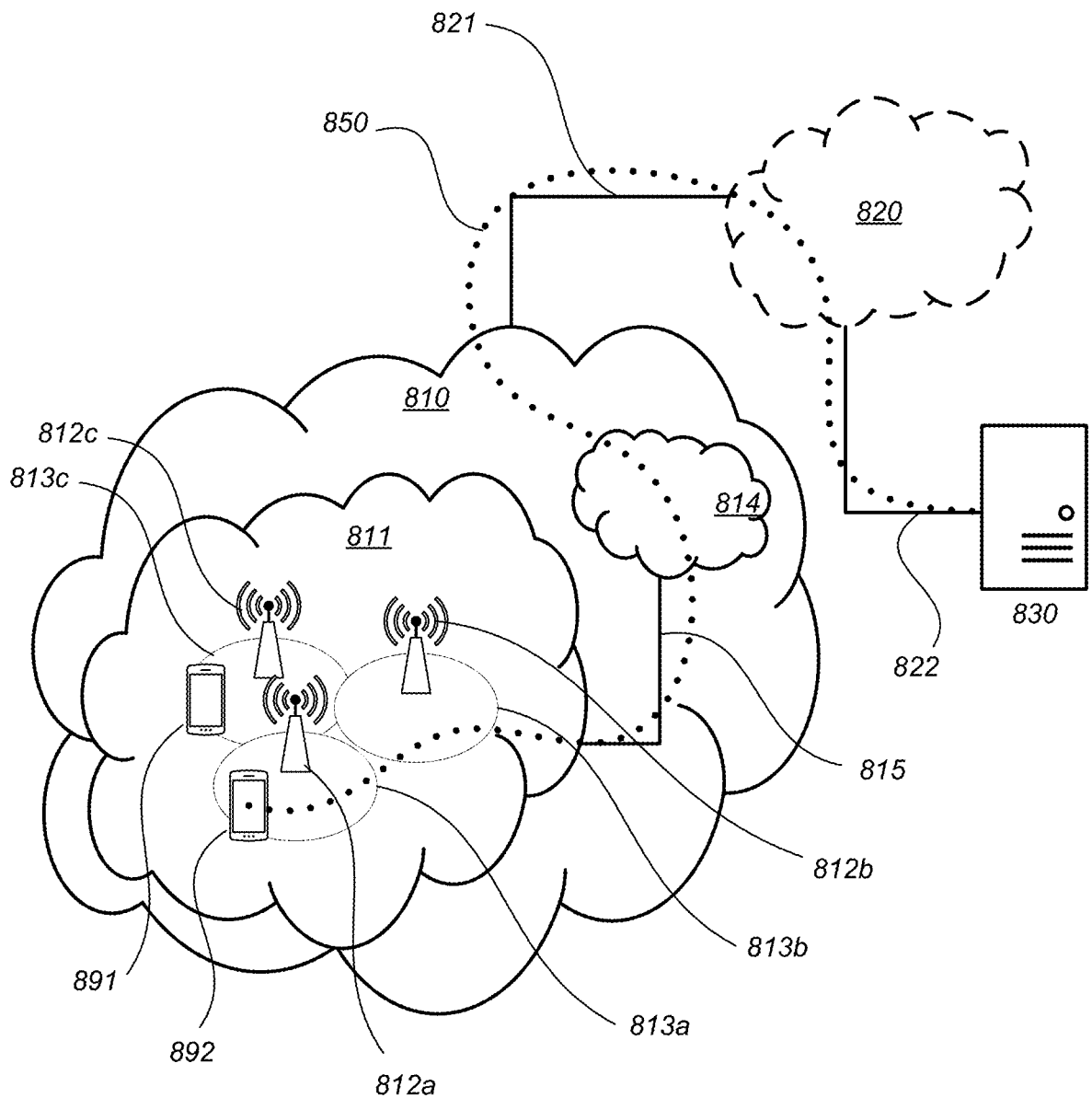
FIG. 8 illustrates an example communication system, according to some embodiments.

FIG. 8, in accordance with various embodiments, shows a communication system that includes a telecommunication network 810, such as a 3GPP-type cellular network, which comprises an access network 811, such as an gNB-RAN, and a core network 814 (e.g., 5GC). The access network 811 comprises a plurality of base stations 812*a*, 812*b*, 812*c*, such as gNBs or other types of wireless access points, each defining a corresponding coverage area 813*a*, 813*b*, 813*c*. Each base station 812*a*, 812*b*, 812*c* is connectable to the core network 814 over a wired or wireless connection 815. A first UE 891 located in coverage area 813*c* is configured to wirelessly connect to, or be paged by, the corresponding base station 812*c*. A second UE 892 in coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. The connections 821, 822 between the telecommunication network 810 and the host computer 830 may extend directly from the core network 814 to the host computer 830 or may go via an optional intermediate network 820. The intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between one of the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, a base station 812 may not or need not be informed about the past routing of an incoming downlink communication with data originating from a host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as a UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware enabling it to communicate with the host computer 910 and with the UE 930. The hardware may include a communication interface for setting up and maintaining a wired or wireless connection with an interface of a different communication device of the communication system 900, as well as a radio interface for setting up and maintaining at least a wireless connection 970 with a UE 930 located in a coverage area (not shown in FIG. 9) served by the base station 920. The communication interface may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the base station 920 comprises a control unit 10 (e.g., gNB-CU) that controls radio access points 30 (e.g., gNB-DUs) that communicate with and may perform handover for the UE 930. The details of the control unit 10 and a radio access point 30 were described earlier with reference to FIGS. 3 and 7.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
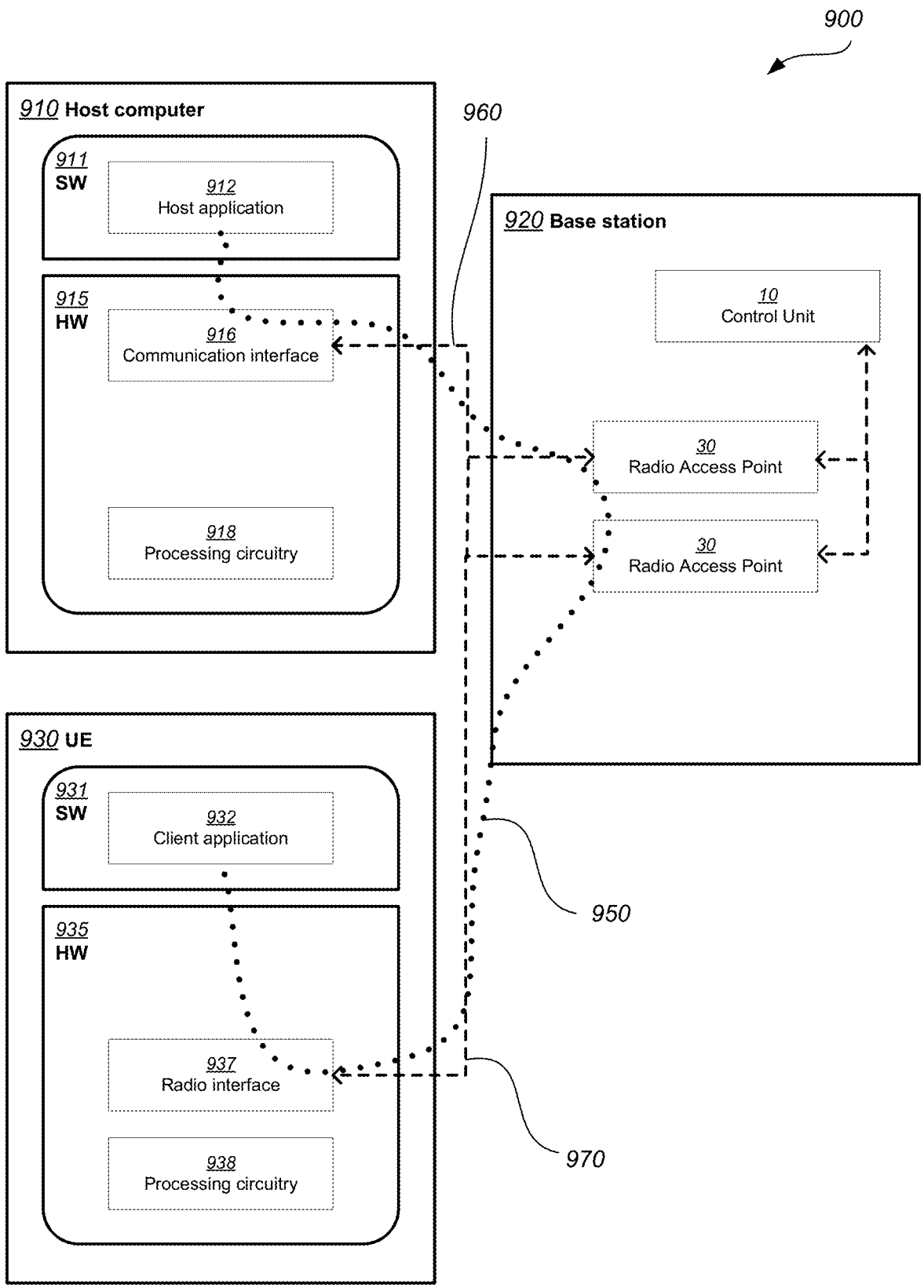
FIG. 9 is a generalized block diagram of a host computer communicating via a base station with a user equipment over a partially wireless connection, according to some embodiments.

It is noted that the host computer 910, base station 920 and UE 930 illustrated in FIG. 9 may be identical to the host computer 830, one of the base stations 812a, 812b, 812c and one of the UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the use equipment 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments provide for suitable information to trigger DD can be conveyed from DUs to the CU to provide a good basis for the decision logic in the CU on when to trigger DD. This results in additional advantages. One advantage is that valuable TN and air interface bandwidth will be saved, since DD will only be triggered when needed. Consequently, less redundant data, due to unnecessary DD, will be generated. Another advantage is that retainability and reliability of data delivery will be improved, since DD will be triggered expediently when poor radio conditions that warrant DD have been identified. This will result in improved performance for users of the RAN.

A measurement procedure may be provided for the purpose of monitoring data rate, latency and other factors on which the one or more embodiments improve. There may further be an optional network functionality for reconfiguring the OTT connection 950 between the host computer 910 and UE 930, in response to variations in the measurement results. The measurement procedure and/or the network functionality for reconfiguring the OTT connection 950 may be implemented in the software 911 of the host computer 910 or in the software 931 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer's 910 measurements of throughput, propagation times, latency and the like. The measurements may be implemented in that the software 911, 931 causes messages to be transmitted, in particular empty or 'dummy' messages, using the OTT connection 950 while it monitors propagation times, errors etc.

Figure 10:
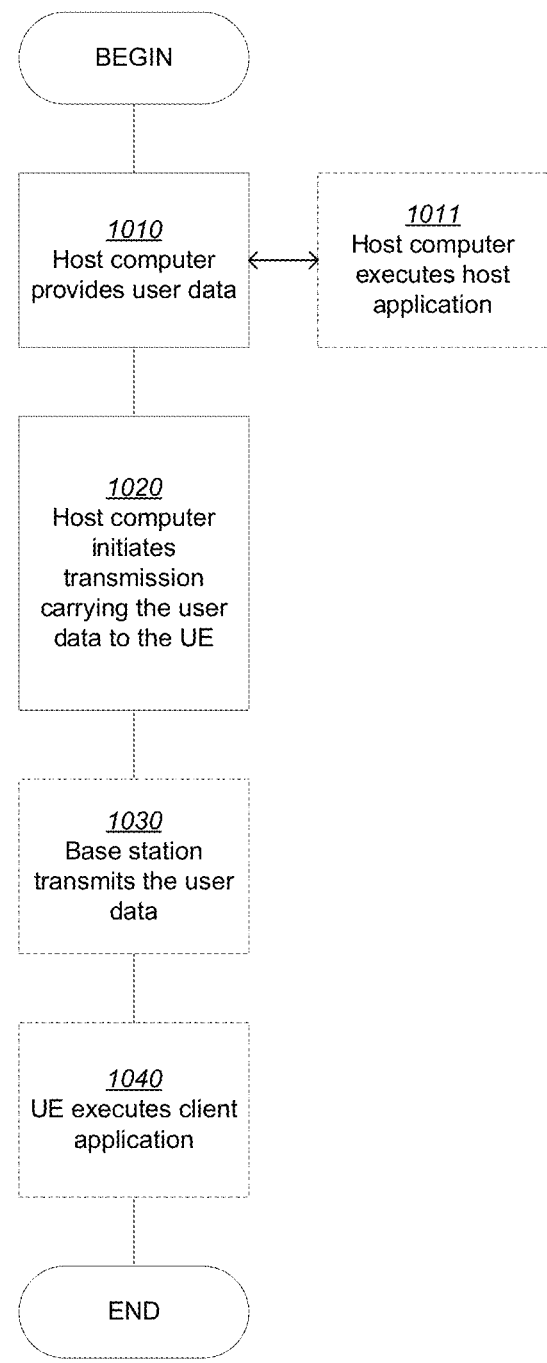
FIG. 10-13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 1010 of the method, the host computer provides user data. In an optional substep 1011 of the first step 1010, the host computer provides the user data by executing a host application. In a second step 1020, the host computer initiates a transmission carrying the user data to the UE. In an optional third step 1030, the base station transmits to the UE the user data which was carried in the transmission that the host computer initiated, in accordance with the teachings of the embodiments described throughout this disclosure. In an optional fourth step 1040, the UE executes a client application associated with the host application executed by the host computer.

Figure 11:
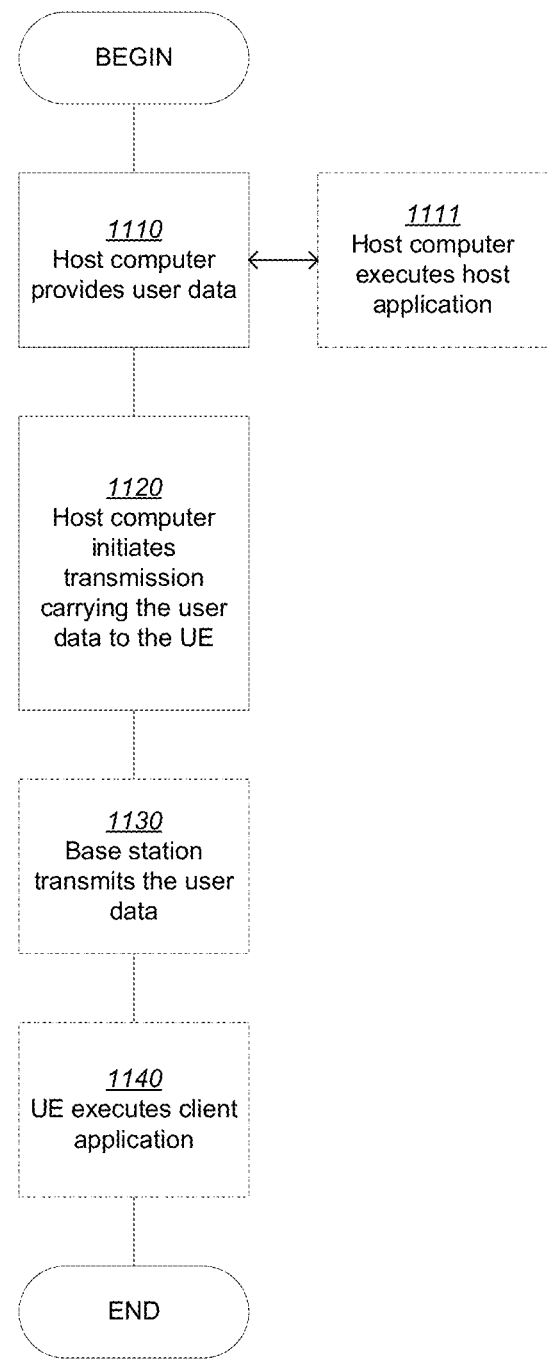

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 1110 of the method, the host computer provides user data. In an optional substep (not shown), the host computer provides the user data by executing a host application. In a second step 1120, the host computer initiates a transmission carrying the user data to the UE. The transmission may pass via the base station, in accordance with the teachings of the embodiments described throughout this disclosure. In an optional third step 1130, the UE receives the user data carried in the transmission.

Figure 12:
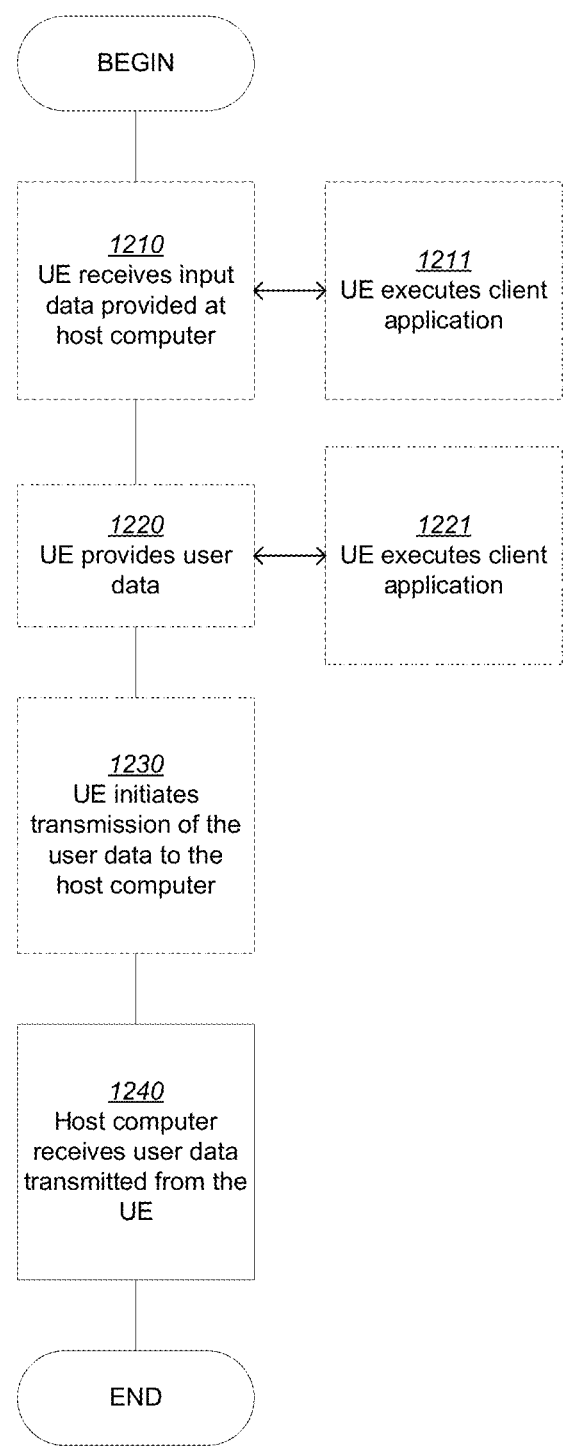

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 1210 of the method, the UE receives input data provided by the host computer. Additionally or alternatively, in an optional second step 1220, the UE provides user data. In an optional substep 1221 of the second step 1220, the UE provides the user data by executing a client application. In a further optional substep 1211 of the first step 1210, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1230, transmission of the user data to the host computer. In a fourth step 1240 of the method, the host computer receives the user data transmitted from the UE, in accordance with the teachings of the embodiments described throughout this disclosure.

According to some embodiments, a method implemented in a communication system including a host computer, a base station and a UE, includes, at the host computer, providing user data and initiating a transmission carrying the user data to the UE via a cellular network comprising the base station. The base station performs a method for controlling the use of DD for a UE simultaneously served by two or more DUs that comprises receiving, from one or more of the DUs, feedback information and determining, based on the feedback information, whether to activate DD for transmissions to the UE. The method may further include, at the base station, transmitting the user data. The user data may be provided at the host computer by executing a host application, the method further comprising, at the UE, executing a client application associated with the host application.

According to some embodiments, a method implemented in a communication system including a host computer, a base station, and a UE includes, at the host computer, receiving, from the base station, user data originating from a transmission which the base station has received from the UE. The base station performs a method for controlling the use of DD for a UE simultaneously served by two or more DUs that comprises receiving, from one or more of the DUs, feedback information and determining, based on the feedback information, whether to activate DD for transmissions to the UE. The method may comprise, at the base station, receiving the user data from the UE. The method may further comprise, at the base station, initiating a transmission of the received user data to the host computer.

According to some embodiments, a communication system including a host computer comprises processing circuitry configured to provide user data and a communication interface configured to forward the user data to a cellular network for transmission to a UE, where the cellular network comprises a base station having communication circuitry and processing circuitry. The base station's processing circuitry is configured to control the use of DD for a UE simultaneously served by two or more DUs by receiving, from one or more of the DUs, feedback information and determining, based on the feedback information, whether to activate DD for transmissions to the UE. The communication system may further include the base station. The communication system may further include the UE, where the UE is configured to communicate with the base station. The processing circuitry of the host computer may be configured to execute a host application, thereby providing the user data, and the UE may comprise processing circuitry configured to execute a client application associated with the host application.

According to some embodiments, a communication system including a host computer comprising a communication interface configured to receive user data originating from a transmission from a UE to a base station, where the base station is configured to control the use of DD for a UE simultaneously served by two or more DUs and comprises a radio interface and processing circuitry. The base station's processing circuitry is configured to receiving, from one or more of the DUs, feedback information and determining, based on the feedback information, whether to activate DD for transmissions to the UE. The communication system may further include the base station. The communication system may further include the UE, where the UE is configured to communicate with the base station. The host computer may comprise processing circuitry configured to execute a host application, and the UE may be configured to execute a client application associated with the host application, thereby providing the user data to be received by the host computer.

Figure 13:
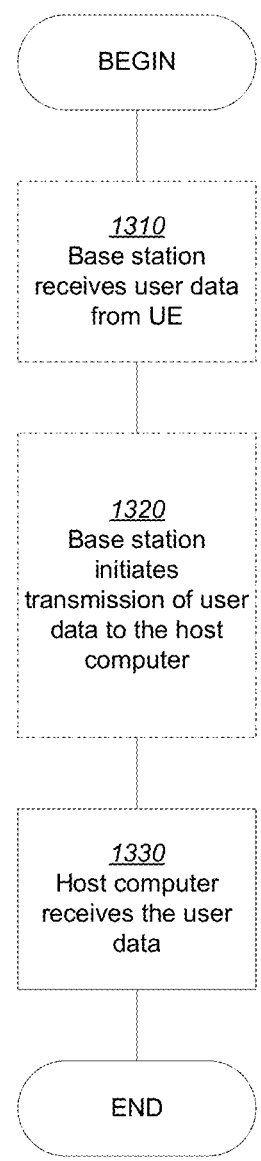

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 1310 of the method, in accordance with the teachings of the embodiments described throughout this disclosure, the base station receives user data from the UE. In an optional second step 1320, the base station initiates transmission of the received user data to the host computer. In a third step 1330, the host computer receives the user data carried in the transmission initiated by the base station.

Figure 14:
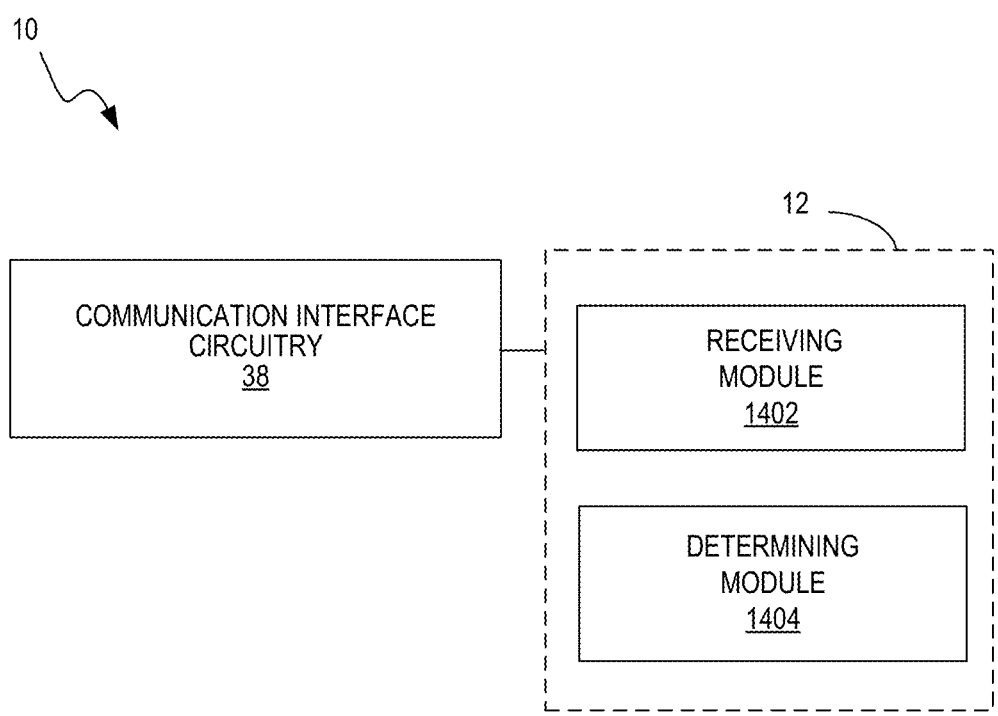
FIG. 14 is a block diagram illustrating a functional implementation of a control unit, according to some embodiments.

FIG. 14 illustrates an example functional module or circuit architecture as may be implemented in one or more network nodes of a wireless communication system, for controlling the use of DD for a UE simultaneously served by two or more DUs. The illustrated embodiment at least functionally includes a receiving module 1402 for receiving, from one or more of the DUs, feedback information, and a determining module 1404 for determining, based on the feedback information, whether to activate DD for transmissions to the UE.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in one or more network nodes of a wireless communication system, for controlling the use of data duplication (DD) for a user equipment (UE) simultaneously served by two or more distributed transmission units (DUs), the method comprising:
   receiving, from one or more of the DUs, feedback information; and
   determining, based on the feedback information, whether to activate DD for transmissions to the UE.

2. The method of claim 1, wherein the feedback information comprises and the determining is based on radio quality information.

3. The method of claim 1, wherein the feedback information comprises and the determining is based on any one or more of:
   a Signal to Noise Ratio (SNR) for a link between the UE and the respective DU;
   a Channel Quality Indicator (CQI) for a link between the UE and the respective DU;
   a Reference Signal Received Power (RSRP) for a link between the UE and the respective DU;
   a Reference Signal Received Quality (RSRQ) for a link between the UE and the respective DU; and
   an average Receive Signal Strength Indicator (RSSI) for a link between the UE and the respective DU.

4. The method of claim 2, wherein the feedback information is reported on a per-channel basis.

5. The method of claim 1, wherein the feedback information comprises load and/or congestion information for the respective DU, and the determining is based on the load and/or congestion information.

6. The method of claim 5, wherein said determining is based on an evaluation of load and/or congestion information for all of the two or more DUs.

7. The method of claim 1, wherein the feedback information comprises hybrid automatic-repeat-request (HARQ) information and/or retransmission information for the respective DU, and the determining is based on the HARQ information and/or retransmission information for the respective DU.

8. The method of claim 1, wherein the feedback information comprises latency and/or packet age information for the respective DU, and the determining is based on the latency and/or packet age information for the respective DU.

9. The method of claim 1, wherein the feedback information comprises packet loss information for the respective DU, and the determining is based on the packet loss information for the respective DU.

10. The method of claim 1, wherein the feedback information is received via in-band signaling in one or more user-plane data frames.

11. The method of claim 1, wherein the method further comprises activating DD for transmissions to the UE via the two or more DUs.

12. The method of claim 11, wherein said activating comprises sending one or more configuration messages to the UE to indicate that DD is active.

13. One or more network nodes of a wireless communication system, for controlling the use of data duplication (DD) for a user equipment (UE) simultaneously served by two or more distributed transmission units (DUs), the one or more network nodes comprising:
    communication circuitry; and
    processing circuitry operatively associated with the communication circuitry and configured to:
        receive, from one or more of the DUs, feedback information; and
        determine, based on the feedback information, whether to activate DD for transmissions to the UE.

14. The one or more network nodes of claim 13, wherein the feedback information comprises and the processing circuitry is configured to determine whether to activate DD for transmissions to the UE based on radio quality information.

15. The one or more network nodes of claim 13, wherein the feedback information comprises and the processing circuitry is configured to determine whether to activate DD for transmissions to the UE based on any one or more of:
    a Signal to Noise Ratio (SNR) for a link between the UE and the respective DU;
    a Channel Quality Indicator (CQI) for a link between the UE and the respective DU;
    a Reference Signal Received Power (RSRP) for a link between the UE and the respective DU;
    a Reference Signal Received Quality (RSRQ) for a link between the UE and the respective DU; and
    an average Receive Signal Strength Indicator (RSSI) for a link between the UE and the respective DU.

16. The one or more network nodes of claim 14, wherein the feedback information is reported on a per-channel basis.

17. The one or more network nodes of claim 13, wherein the feedback information comprises load and/or congestion information for the respective DU, and the processing circuitry is configured to determine whether to activate DD for transmissions to the UE based on the load and/or congestion information.

18. The one or more network nodes of claim 17, wherein the processing circuitry is configured to determine whether to activate DD for transmissions to the UE based on an evaluation of load and/or congestion information for all of the two or more DUs.

19. The one or more network nodes of claim 13, wherein the feedback information comprises hybrid automatic-repeat-request (HARQ) information and/or retransmission information for the respective DU, and the processing circuitry is configured to determine whether to activate DD for transmissions to the UE based on the HARQ information and/or retransmission information for the respective DU.

20. The one or more network nodes of claim 13, wherein the feedback information comprises latency and/or packet age information for the respective DU, and the processing circuitry is configured to determine whether to activate DD for transmissions to the UE based on the latency and/or packet age information for the respective DU.

21. The one or more network nodes of claim 13, wherein the feedback information comprises packet loss information for the respective DU, and the processing circuitry is configured to determine whether to activate DD for transmissions to the UE based on the packet loss information for the respective DU.

22. The one or more network nodes of claim 13, wherein the feedback information is received via in-band signaling in one or more user-plane data frames.

23. The one or more network nodes of claim 13, wherein the processing circuitry is configured to activate DD for transmissions to the UE via the two or more DUs.

24. The one or more network nodes of claim 23, wherein the processing circuitry is configured to activate DD by sending one or more configuration messages to the UE to indicate that DD is active.

25. A non-transitory computer readable medium storing a computer program for controlling the use of data duplication (DD) for a user equipment (UE) simultaneously served by two or more distributed transmission units (DUs), the computer program comprising instructions that, when executed by at least one processor of one or more network nodes of a wireless communication system, cause the one or more network nodes to:
    receive, from one or more of the DUs, feedback information; and
    determine, based on the feedback information, whether to activate DD for transmissions to the UE.

* * * * *